US012800111B2

(12) United States Patent
Wu et al.

(10) Patent No.: US 12,800,111 B2
(45) Date of Patent: Nov. 17, 2026

(54) SYSTEM AND METHOD FOR SUPPLYING ACETYLENE

(71) Applicant: L'Air Liquide, Société Anonyme pour l'Etude et l'Exploitation des Procédés Georges Claude, Paris (FR)

(72) Inventors: Tong Wu, Shanghai (CN); Zhijun Jiang, Shanghai (CN); Peter Vankampen, Shanghai (CN)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 350 days.

(21) Appl. No.: 18/532,666

(22) Filed: Dec. 7, 2023

(65) Prior Publication Data

US 2024/0191839 A1 Jun. 13, 2024

(30) Foreign Application Priority Data

Dec. 13, 2022 (CN) ......................... 202211604102.5

(51) Int. Cl.
*G01N 33/00* (2006.01)
*B01F 23/10* (2022.01)
(Continued)

(52) U.S. Cl.
CPC ................ *F17C 9/00* (2013.01); *B01F 23/19* (2022.01); *B01F 35/21112* (2022.01);
(Continued)

(58) Field of Classification Search
CPC .. F17C 9/00; F17C 11/002; F17C 2201/0104; F17C 2205/0326; F17C 2205/0338;
(Continued)

(56) References Cited

U.S. PATENT DOCUMENTS 8,129,577 B2 3/2012 Maykut et al.
8,398,747 B2 * 3/2013 Song .................... B01J 20/3416 96/121

(Continued)

FOREIGN PATENT DOCUMENTS

CN 101737624 6/2010
CN 106248778 12/2016

(Continued)

OTHER PUBLICATIONS

Chan, et al., "Optical detection of C2 hydrocarbons ethane, ethylene, and acetylene with a photonic crystal made from carbonized porous silicon," Inorganica Chimica ACTA, Elsevier BV, NL, vol. 422, Aug. 12, 2014, pp. 21-29.

*Primary Examiner* — Robert R Raevis

(74) *Attorney, Agent, or Firm* — Allen E. White; Elwood L. Haynes

(57) ABSTRACT

The present application discloses a system and method for supplying acetylene, the system having at least one acetylene storage apparatus, a detection module, a gas dilution module and a gas supply regulating module. By mixing a feedstock stream outputted from the acetylene storage apparatus with a diluting gas in a specific ratio, a photoionization detector is successfully used to detect a solvent content in the feedstock stream. This real-time and continuous detection method ensures a stable supply of acetylene to a downstream process.

8 Claims, 4 Drawing Sheets

(51) Int. Cl.

| | |
|---|---|
| ***B01F 35/21*** | (2022.01) |
| ***B01F 35/22*** | (2022.01) |
| ***B01F 35/221*** | (2022.01) |
| ***B01F 35/83*** | (2022.01) |
| ***F17C 9/00*** | (2006.01) |
| ***F17C 11/00*** | (2006.01) |

(52) U.S. Cl.
CPC ...... *B01F 35/2132* (2022.01); *B01F 35/2202* (2022.01); *B01F 35/2213* (2022.01); *B01F 35/833* (2022.01); *F17C 11/002* (2013.01); *F17C 2201/0104* (2013.01); *F17C 2205/0326* (2013.01); *F17C 2205/0338* (2013.01); *F17C 2221/018* (2013.01); *F17C 2250/043* (2013.01); *F17C 2250/0443* (2013.01); *F17C 2250/0452* (2013.01)

(58) Field of Classification Search
CPC .......... F17C 2221/018; F17C 2250/043; F17C 2250/0443; F17C 2250/0452; B01F 23/19; B01F 35/21112; B01F 35/2132; B01F 35/2202; B01F 35/2213; B01F 35/833; G01N 33/0018; G01N 33/0047; G01N 27/66; G01N 1/38; G05D 11/131
USPC .......... 73/23.2, 23.41, 31.05, 866; 48/198.3; 585/401, 501, 701, 821; 204/400
See application file for complete search history.

(56) References Cited

U.S. PATENT DOCUMENTS

| | | | |
|---|---|---|---|
| 8,970,221 | B2 | 3/2015 | Shinada et al. |
| 12,055,273 | B2 | 8/2024 | Jiang et al. |
| 2009/0305516 | A1 | 12/2009 | Hsu et al. |
| 2023/0094475 | A1 | 3/2023 | Jiang et al. |

FOREIGN PATENT DOCUMENTS

| | | |
|---|---|---|
| CN | 214147422 U | 9/2021 |
| CN | 113719748 | 11/2021 |
| EP | 4012249 | 6/2022 |
| JP | 2010-070554 | 4/2010 |
| RU | 2340889 | 12/2008 |
| WO | WO 2022/026271 | 2/2022 |

* cited by examiner

SYSTEM AND METHOD FOR SUPPLYING ACETYLENE

CROSS REFERENCE TO RELATED APPLICATIONS

This application claims the benefit of priority under 35 U.S.C. § 119 (a) and (b) to Chinese Patent Application No. 202211604102.5, filed Dec. 13, 2022, the entire contents of which are incorporated herein by reference.

TECHNICAL FIELD

The present application belongs to the field of component determination, and relates to a system and method for supplying acetylene. In particular, it relates to a system and method for a stable and continuous supply of acetylene with a controllable solvent content.

BACKGROUND ART

As an important industrial gas, acetylene has a wide range of applications in the cutting, welding and heat treatment fields. Taking as an example the field of low-pressure carburization, this involves carburization at a very low pressure (7 to 13 mbar). A workpiece is placed in a medium containing active carbon atoms at a certain temperature, so that the carbon atoms penetrate into the surface layer of the workpiece. The surface layer of the workpiece thereby attains sufficiently high hardness, wear resistance and fatigue resistance. Acetylene is the carburization medium best suited to low-pressure carburization processes.

Acetylene has a very wide flammability range. The lower flammability limit (LFL) of acetylene is 2.4%, while its upper flammability limit (UFL) is 83%. The thermal instability of acetylene poses a number of challenges for acetylene storage. For this reason, acetylene is generally stored in acetylene cylinders with specific requirements. The interior of an acetylene cylinder is filled with a porous filler medium of a certain porosity and a solvent distributed therein. Acetone, dimethylformamide (DMF) and N-methylpyrrolidone (NMP) are common solvents for dissolving acetylene, due to their ability to solubilize acetylene. These solvents can absorb a large amount of acetylene at a relatively low pressure, making it possible for acetylene to be contained in low-pressure cylinders. The solvents are dispersed in the pores of the porous filler medium and around the porous filler medium.

Because DMF and NMP pose a risk to health, acetone is the principal solvent in general use in China at present. The boiling point of acetone is just 56.53° C., so it volatilizes very easily. Acetone vapour can be outputted from the acetylene cylinder and is inevitably delivered together with the acetylene. As the acetylene in the acetylene cylinder is gradually consumed, the proportion of acetone mixed into the acetylene will greatly increase. Acetone thus becomes a contaminant in the acetylene, ultimately lowering the film deposition rate and the film uniformity.

Due to the lack of an effective method for monitoring the solvent content in real time, a user will often rely on experience to switch to a new acetylene cylinder when the remaining acetylene pressure in the cylinder falls to an empirical value. In the case of an acetone-acetylene cylinder, it is generally advised to switch cylinders when the cylinder pressure displays approximately 6 bar, to prevent too much acetone solvent from entering the downstream process. However, because a large number of factors influence the content of solvent in the acetylene cylinder, the abovementioned method of estimating the remaining acetylene gas pressure is not precise enough. If the estimated value is too low, a large amount of solvent will still be inevitably introduced in the downstream process, and this is not desirable. If the estimated value is too high, frequent switching of acetylene cylinders is very uneconomical.

The US patent with publication number U.S. Pat. No. 8,398,747B has disclosed a method for supplying high-purity acetylene to a work device. The method provides an adsorbent bed containing adsorption media, wherein the adsorption media at least comprise a first adsorption medium capable of selectively removing moisture, a second adsorption medium capable of selectively removing a solvent, and a third adsorption medium capable of selectively removing carbon dioxide, etc. In this way, the levels of moisture, solvent and carbon dioxide in acetylene discharged from a storage vessel are reduced in order to supply high-purity acetylene. However, a drawback of the method is that a very large amount of energy needs to be consumed to regenerate the adsorption media. Furthermore, the solvent needs to be removed in the process of regenerating the adsorption media, and more solvent must be consumed in a subsequent process of reloading.

The Chinese invention patent application with publication no. CN113719748A has disclosed a system and method for supplying acetylene to an acetylene-using apparatus. In the apparatus, GC-FID (gas chromatography-flame ionization detector) or Fourier transform infrared spectroscopy (FTIR) is used to detect the solvent concentration in acetylene. However, GC-FID is a non-continuous measurement method, which is unable to provide continuous, real-time measurement results. FTIR, on the other hand, has very demanding operating conditions, with very high costs.

In view of the above, the applicant wishes to research a system and method for supplying acetylene, which can monitor the content of solvent in an acetylene cylinder in real time, in order to precisely indicate the acetylene purity or solvent content in the acetylene cylinder, thus eliminating the shortcomings in the prior art.

SUMMARY OF THE INVENTION

To solve the abovementioned technical problems, the applicant wishes to find a method, which is continuously and easily operable in real time, for detecting the solvent content in an acetylene cylinder, in order to achieve a stable and reliable supply of acetylene.

A first aspect of the present application discloses a system for supplying acetylene, comprising:

- at least one acetylene storage apparatus, for supplying a feedstock stream comprising acetylene and a solvent;
- a gas dilution module, for uniformly mixing a portion of the feedstock stream with a diluting gas according to a ratio to obtain mixed gases to be measured, the gas dilution module comprising a pressure equalization apparatus, a filtration apparatus, a flow regulating apparatus and a pre-mixing apparatus;
- a detection module, comprising a photoionization detector and a control unit, wherein the mixed gases to be measured enter the photoionization detector and are ionized by excitation, generating a measurement signal, and the control unit is configured to compute a solvent concentration on the basis of the measurement signal from the photoionization detector, make a comparison with a solvent concentration preset value, and output a control signal;

a gas supply regulating module, comprising a solenoid valve, a pressure transmitter and a flow sensor, all of which are electrically connected to the control unit, the solenoid valve being used to switch each acetylene storage apparatus, the pressure transmitter being used to detect a pressure of the feedstock stream outputted by each acetylene storage apparatus, and the flow sensor being used to detect a flow rate of a feedstock stream supplied to an acetylene-using apparatus.

Further, the gas supply-regulating module is used to switch the acetylene storage apparatus when the solvent concentration in the feedstock stream exceeds a preset value or the pressure of the feedstock stream is lower than a preset pressure.

The solvent concentration preset value may be set according to downstream process requirements, and may vary within the range of several hundred to several thousand ppm. No restriction is imposed in embodiments of the present application.

Further, in the gas dilution module, the volume ratio of the diluting gas to the portion of the feedstock stream is greater than or equal to 50, preferably greater than or equal to 60.

Further, the acetylene storage apparatus is an acetylene cylinder or a set of acetylene cylinders.

Further, the pressure equalization apparatus in the gas dilution module comprises a first pressure regulator for regulating the pressure of the portion of the feedstock stream, and a second pressure regulator for regulating the pressure of the diluting gas.

Further, the first pressure regulator reduces the pressure of the portion of the feedstock stream entering the gas dilution module to below 0.5 kg.

Further, the second pressure regulator reduces the pressure of the diluting gas entering the gas dilution module to below 0.5 kg.

Further, a linear characteristic equation for acetone concentration-response voltage is contained in the control unit.

Further, the filtration apparatus in the gas dilution module may be a sintered filter. Preferably, the filtration apparatus is used to filter particulate impurities in feedstock gas.

Further, the flow regulating apparatus in the gas dilution module comprises a first flow regulating apparatus for regulating a flow rate of the portion of the feedstock stream, and a second flow regulating apparatus for regulating a flow rate of the diluting gas. Preferably, the flow regulating apparatus is a mass flow controller.

Further, the pre-mixing apparatus in the gas dilution module comprises a static mixer, for mixing the diluting gas and the portion of the feedstock stream uniformly.

A second aspect of the present application discloses a method for using the system of the first aspect to supply acetylene, the method comprising the following steps:

(1) providing at least one acetylene storage apparatus, for supplying a feedstock stream comprising acetylene and a solvent;

(2) providing a gas dilution module, in which a portion of the feedstock stream is mixed with a diluting gas according to a ratio, to obtain mixed gases to be measured;

(3) providing a detection module, wherein the mixed gases to be measured enter a photoionization detector and are ionized by excitation, generating a measurement signal, and a control unit receives the measurement signal and computes a solvent concentration in the feedstock stream, outputting a corresponding control signal;

(4) providing a gas supply regulating module, which receives the control signal and controls the switch of the acetylene storage apparatus.

Further, in step (3), a linear characteristic equation is written into the control unit, and the solvent concentration in the feedstock stream is computed on the basis of the measurement signal and the linear characteristic equation.

Further, in step (3), the control unit also compares the computed solvent concentration in the feedstock stream with a solvent concentration preset value.

Further, in step (3), the computed solvent concentration and a feedstock stream flow rate value are integrated in the control unit, to obtain the total amount of solvent delivered downstream, so as to make a comparison with a preset value for the total amount of solvent.

Compared with the prior art, the technical solution provided in the present invention has the following advantages:

1. The applicant unexpectedly discovered that a photoionization detector can be used to detect the solvent content of an acetylene cylinder. Photoionization detectors have advantages such as high precision, fast response, and the ability to perform testing continuously.
2. By mixing a portion of the feedstock stream with diluting gas in a specific ratio, interference caused to solvent content detection by the acetylene background is effectively eliminated, and real-time continuous detection is thereby achieved.
3. The method of the present application can serve as a means for testing acetylene cylinders that have been filled, to check whether the initial solvent content is too high.
4. By integrating the solvent concentration and the flow rate value of a main pipeline feedstock stream in the control unit, the total amount of solvent delivered downstream in batch production can be computed. An alarm strategy is deployed, and an alarm is issued when the total amount of solvent reaches a preset value.

BRIEF DESCRIPTION OF THE DRAWINGS

The advantages and spirit of the present application can be further understood from the following detailed description of the invention and the accompanying drawings.

DETAILED DESCRIPTION OF THE INVENTION

Figure 1:
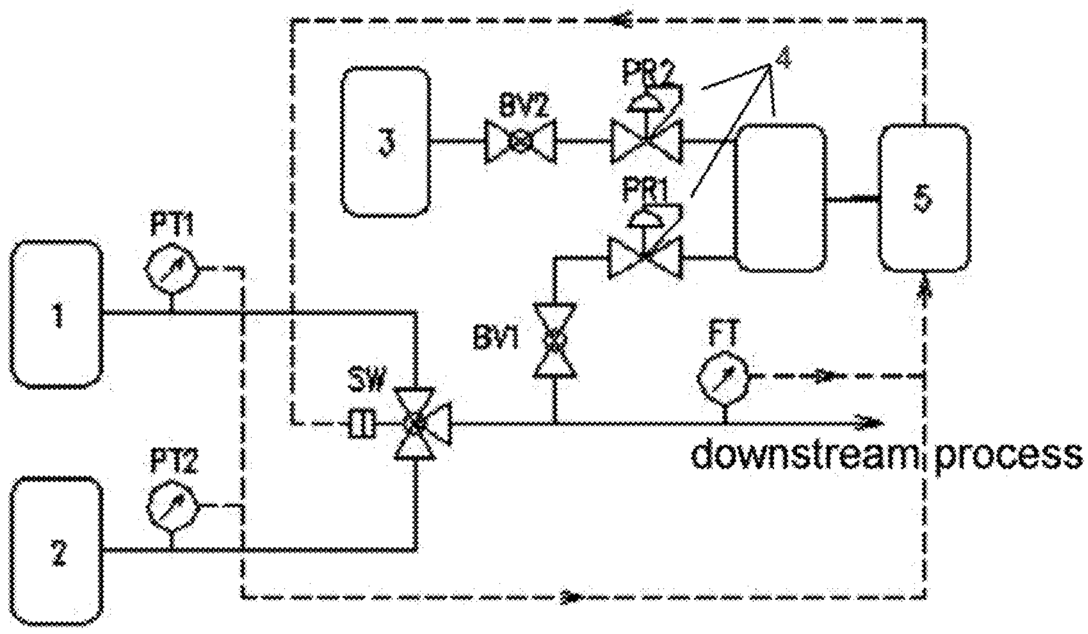
FIG. 1 shows a schematic flow chart of a system for supplying acetylene in embodiments of the present invention.

Specific embodiments of the present application are described in detail below with reference to the accompanying drawings. However, it should be understood that the present application is not limited to the implementations described below, and the technical concept of the present application may be implemented in combination with other well-known techniques or other technologies having the same functions as those well-known techniques.

In the description of the specific embodiments below, in order to clearly show the structure and manner of operation of the present application, many directional terms will be used for description, but terms such as "front", "rear", "left", "right", "outer", "inner", "outward", "inward", "axial", "radial", etc. should be understood to be terms of convenience rather than restrictive terms.

In the explanation of particular embodiments below, it must be understood that orientational or positional relationships indicated by terms such as "length", "width", "up", "down", "front", "rear", "left", "right", "vertical", "horizontal", "top", "bottom", "inner" and "outer" are based on the orientational or positional relationships shown in the drawings, and are merely intended to facilitate and simplify the description of the present application, without indicating or implying that the device or element referred to must have a specific orientation or be constructed and operated in a specific orientation, and therefore should not be understood as limiting the present application.

In addition, the terms "first" and "second" are only used for descriptive purposes rather than limiting chronological order, quantity, or importance, should not be construed as indicating or implying relative importance or implicitly specifying the number of technical features indicated, and are only intended to differentiate one technical feature from another technical feature in the present technical solution. Hence, a feature defined with "first" and "second" may explicitly or implicitly include one or a plurality of the feature. In the description of the present application, "multiple" means two or more, unless otherwise expressly and specifically specified. Similarly, qualifiers similar to "a" appearing herein do not indicate a limitation of quantity, but describe a technical feature that has not appeared in the preceding text. Similarly, unless modified by a specific quantity measure word, nouns herein should be regarded as including both singular and plural forms, i.e. the technical solution may include a single one of the technical feature concerned, but may also include a plurality of the technical feature. Similarly, modifiers similar to "approximately" and "about" appearing before numerals herein usually include the numeral, and the specific meaning thereof should be understood with reference to the context.

It should be understood that in the present application, "at least one (item)" means one or more, and "multiple" means two or more. The expression "and/or" is used to describe the associative relationship between associated objects, and indicates that three relationships may exist. For example, "A and/or B" can mean three situations: A alone is present, B alone is present, or A and B are both present, wherein A and B may be singular or plural. The symbol "/" generally indicates an "or" relationship between the associated objects. "At least one of the following items (pieces)" or a similar expression means any combination of these items, including a single item (piece) or any combination of multiple items (pieces). For example, at least one (item) of a, b or c can mean: a, b, c, "a and b", "a and c", "b and c", or "a and b and c", wherein a, b and c may be single or multiple.

In the present application, unless otherwise explicitly specified and defined, terms such as "mounted", "connected", "connect" and "fixed" should be understood in a broad sense. For example, there may be a fixed connection, or there may be a removable connection, or the connection may be integral; there may be a mechanical connection, or there may be an electrical connection; there may be a direct connection, or there may be an indirect connection via an intermediate medium, there may be internal communication between two elements or an interactive relationship between two elements. Those skilled in the art can understand the specific meaning of the above terms in the present application according to the specific circumstances. The expression "fixedly connected" or "fixed connection" or "immovably connected" is understood to mean that a connection between two or more structural members is not configured to provide relative movement. An example of a fixed connection is a welded joint or a bolt connection, and in some cases a weld seam and bolt connection. The expression "movably connected" or "movable" or "movable connection" is understood to mean that a connection between two or more structural members allows horizontal and/or vertical relative movement between the members under extreme driving force loads. Such a connection generally does not allow movement under static loads or ordinary driving force loads (e.g. such as are exerted from light/medium wind forces).

The terms "unit", "member", "object" and "module" described herein indicate units used to process at least one function and operation, and can be implemented by means of hardware components or software components and combinations thereof.

As used herein, the expression "containing almost no solvent" means containing 300 ppm or less solvent, preferably containing 200 ppm or less solvent, more preferably containing 100 ppm or less solvent, and most preferably containing 80 ppm or less solvent.

Unless clearly indicated otherwise, each aspect or embodiment defined herein may be combined with any other aspect(s) or embodiment(s). In particular, any preferred or advantageous feature(s) indicated can be combined with any other preferred or advantageous feature(s) indicated.

A photoionization detector (abbreviated PID) may be used to detect concentrations of volatile organic compounds. A PID uses an ultraviolet lamp with a specific ionization energy (e.g. 10.6 eV) to produce ultraviolet light, to ionize organic compounds into positively charged ions and negatively charged electrons. Under the action of an external electric field, the ions and electrons move in fixed directions, forming a detectable photoionization current. There is a linear relationship between the concentration of the organic compound being measured and the photoionization current, so the concentration of the detected organic compound can be ascertained on the basis of the value of the photoionization current. Although a response signal of a PID is related to changes that take place in ionization, such a response signal might be influenced by other interfering signals, resulting in signal artifacts. For example, if there are interfering molecules present that can absorb ultraviolet light and produce a response signal, the detector sensitivity will be reduced.

The mass flow controller referred to herein can use operating principles familiar to those skilled in the art to achieve stable and precise mass flow measurement.

Specific embodiments of the present application are expounded in detail below with reference to the accompanying drawings. In the embodiments below, two acetylene cylinders or a set of two or more acetylene cylinders is taken to be an acetylene storage apparatus.

The system for supplying acetylene provided in this embodiment provides stable, compliant and continuous acetylene delivery to an acetylene-using apparatus in a downstream process by real-time detection of a solvent concentration in a feedstock stream from an acetylene storage apparatus. The system comprises two acetylene cylinders or two sets of two or more acetylene cylinders as the acetylene storage apparatus. Based on the result of real-time monitoring of the solvent concentration in the feedstock stream outputted by each acetylene cylinder, more precise automatic switching between the acetylene cylinders/sets of acetylene cylinders can be achieved. When it is detected that the solvent content in the feedstock stream exceeds a preset value, or when the acetylene content is too low, the system can automatically switch to a new acetylene cylinder.

As shown in FIG. 1, the numerals 1 and 2 represent acetylene cylinders. The acetylene cylinder here is used as an acetylene storage apparatus to supply acetylene to a downstream acetylene-using apparatus.

The numeral 3 in FIG. 1 represents a diluting gas storage apparatus, for storing diluting gas. In this embodiment, diluting gases include but are not limited to inert gases such as nitrogen or argon. These inert gases may be cylinder gases familiar to those skilled in the art.

The numeral 4 in FIG. 1 represents a gas dilution module. The function of the gas dilution module is to uniformly mix a portion of the feedstock stream with diluting gas according to a ratio.

The numeral 5 in FIG. 1 represents a detection module. A control unit and a PID therein are electrically connected. Feedstock streams flowing out of the acetylene storage apparatuses converge in a main pipeline, and the feedstock stream is delivered to the acetylene-using apparatus via the main pipeline. A portion of the feedstock stream is led out of the main pipeline and enters the PID in the detection module 5. The detection principles of the PID are not repeated in the present application. The PID forms a detectable photoionization current signal, and outputs a measurement signal.

The control unit comprises a central processor, an internal memory, an input device and an output device. The input device receives the measurement signal outputted by the photoionization detector. A linear characteristic equation for acetone concentration-response voltage is contained in the central processor, and a solvent concentration value is computed on the basis of the measurement signal. At the same time, the control unit can compare the solvent concentration value with a solvent concentration preset value, and output a corresponding control signal via the output device. As required, the control unit can also display a graph of real-time variation of the solvent concentration of the feedstock stream during delivery.

As known by those skilled in the art, the abovementioned central processor, internal memory, input device and output device may be integrated in a single-chip microcomputer or a programmable controller (PLC). Solvent content data will be recorded in the internal memory of the control unit.

As shown in FIG. 1, PR1 represents a first pressure regulator, for regulating the pressure of the portion of the feedstock stream entering the gas dilution module. PR2 represents a second pressure regulator, for regulating the pressure of the diluting gas entering the gas dilution module.

SW in FIG. 1 represents a solenoid valve. When the solvent concentration of one acetylene cylinder/one set of acetylene cylinders exceeds a preset value, the solenoid valve switches to the other acetylene cylinder/the other set of acetylene cylinders, under the control of the control unit.

BV1 and BV2 in FIG. 1 are ball valves. These may be used to lead a portion of the feedstock stream out to the detection module, and may also be used to isolate upstream gas during whole-system maintenance.

PT1 and PT2 in FIG. 1 represent pressure transmitters. They are connected to the acetylene cylinders, and are also electrically connected to the control unit 5. These pressure transmitters can convert pressure values of the feedstock streams outputted from the acetylene cylinders to pneumatic signals or electrical signals, and send these to the control unit.

BV1 is opened, and a portion of the feedstock stream at a low flow rate is led out from the main pipeline to the gas dilution apparatus 4. The pressure of this portion of the feedstock stream is regulated to not more than 0.5 barg by PR1. BV2 is opened, and the diluting gas has its pressure regulated to not lower than 2 barg by PR2, and enters the gas dilution apparatus 4.

As an example, after output of the feedstock stream by the acetylene cylinder 1 or 2 and after pressure regulation by PT1 or PT2, the pressure of the feedstock stream delivered by the main pipeline is not more than 1.5 barg.

For example, when one acetylene cylinder of about 40 L has just been opened, the amount of solvent volatilized is still very small, and there is no need to immediately activate the PID to detect the solvent content. When the pressure of the feedstock stream outputted by the acetylene cylinder falls to about 10-12 kg, the PID is activated for detection, and it is thus possible to determine the moment to switch acetylene cylinders quite precisely. When the pressure of acetylene gas outputted by the acetylene cylinder 1 or 2 is too low, e.g. lower than about 4 barg, it can be judged, based on experience, that the acetylene concentration in the feedstock stream outputted by the acetylene cylinder at this time does not meet the downstream process requirements. SW is switched, thereby switching to a new acetylene cylinder.

Apart from the low-pressure carburization field, the system and method of the present application may also be used in various scenarios in which the filling status of acetylene cylinders needs to be monitored. For example, in the process of filling an acetylene cylinder, there is a certain probability that fracturing and ageing of porous calcium silicate adsorbent material will occur. At present, the majority of acetylene cylinder users will only discover this after using the acetylene cylinder. The system and method of the present application enable the PID to be used as a verification immediately after filling is complete, to check whether the solvent content therein is too high.

In actual applications, acetylene is after all the component that accounts for an overwhelming proportion of the feedstock stream outputted from the acetylene cylinder, varying from about 99.9% to about 97%. In the past, it was found in practice that a large proportion of acetylene will be ionized when passing through a PID, and this will interfere with solvent detection, thus affecting sensitivity. For this reason, the inventors first researched how to reduce the influence of acetylene on solvent detection.

The inventors have found that this problem can be solved effectively by configuring a gas dilution module. The feedstock stream and the diluting gas are mixed in a certain ratio, so as to reduce the extent to which acetylene interferes with solvent detection. Thus, when they subsequently enter the PID, the solvent detection sensitivity will be higher.

In order to research the effect which acetylene in the feedstock stream has on the determination of the solvent content (taking acetone as an example), the inventors investigated the ratio of diluting gas to the feedstock stream in a targeted manner.

We keep the flow rate of the feedstock stream stable at a low concentration level. This is different from the flow rate range of several hundred litres per hour in a normal operating state. At such a low flow rate, there is no obvious rise in the acetone content in the feedstock stream, and the extent of fluctuation of the actual acetone content is small.

For this purpose, we designed the following experiment to determine a suitable range of diluting gas multiples.

First step: standard gases with a lower concentration of acetone and a higher concentration of acetone are passed into a PID. It is assumed that response voltages (mV) obtained after the two standard gases enter the PID are linear, and a linear characteristic equation for acetone concentration-response voltage is thereby obtained.

Second step: an acetylene cylinder is provided, and the flow rate of a feedstock stream is held stable at about 5 to 20 ml per min. We believe that at this low flow rate, the extent of fluctuation of the acetone concentration in the feedstock stream is very small, so the acetone concentration may be regarded as remaining constant.

Third step: the flow rates of a diluting gas (e.g. nitrogen) and the feedstock stream are regulated by a mass flow controller, to obtain multiple sets of mixed gases to be measured which have different dilution ratios. Each set of mixed gases to be measured is separately inputted into the PID to obtain a corresponding response voltage (mV).

Fourth step: based on the linear characteristic equation obtained in the first step and the response voltage value in the third step, the concentration of acetone entering the PID is computed, and then multiplied by the dilution multiple corresponding to each set to compute the acetone concentration in the feedstock stream.

Figure 2:
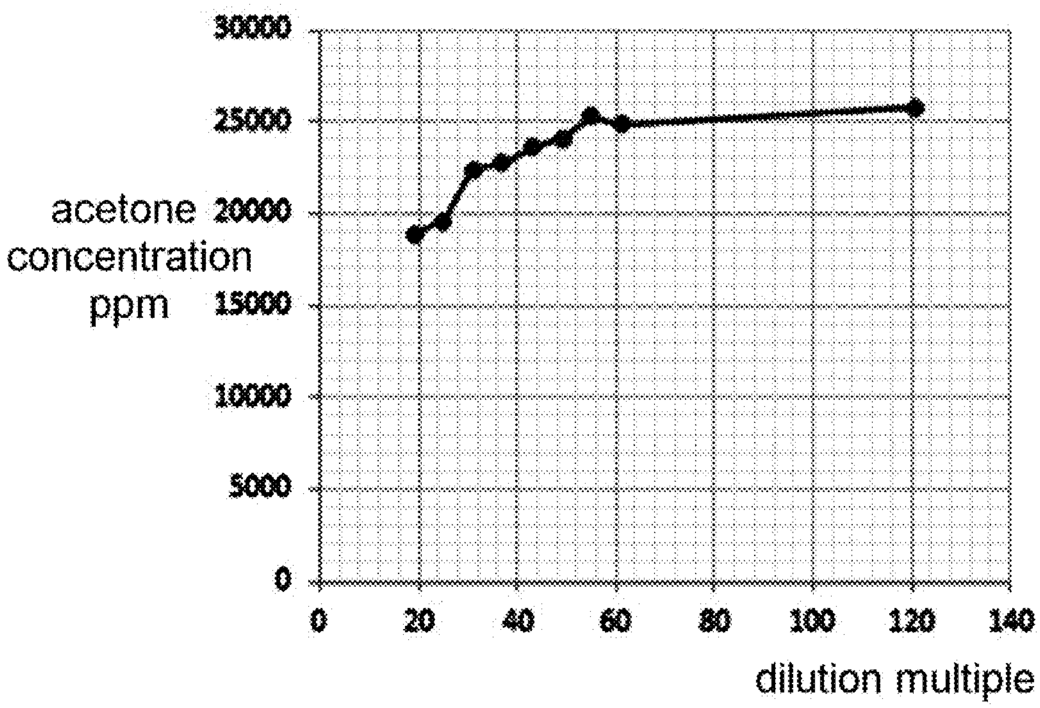
FIG. 2 shows the variation of computed acetone concentration in a feedstock stream for different dilution multiples.

It can be seen from FIG. 2 that at the initially low dilution ratios, the acetone concentration value rises continuously due to the effect of the acetylene background. As the dilution ratio increases, the effect of the acetylene background continuously decreases, and the acetone concentration value tends to become constant, at which time the dilution ratio is suitable. When the volume ratio of diluting gas to the feedstock stream is lower than 50, and further, lower than 60, the detected acetone content is unstable. This is because, when there is not much diluting gas, the degree of acetone signal attenuation is still very high. When the volume ratio of diluting gas to the feedstock stream is more than 50, and further, more than 60, the detected acetone content is essentially stable. This indicates that the signal attenuation caused by acetylene has already been substantially eliminated. When the proportion of diluting gas is increased further, the measured acetone content is stable, and will not fluctuate due to a reduction in the attenuation effect.

For this reason, taking into consideration the effectiveness and uniformity of measurement, we decided to set the volume ratio of diluting gas to the feedstock stream (i.e. the dilution multiple) to 60 in subsequent embodiments, and this can effectively reduce the effect of ultraviolet energy absorption by acetylene.

To verify the effectiveness of the system and method of the present application, the inventors used a gas chromatography flame ionization detector (GC-FID) to detect the solvent concentration value. An acetylene cylinder to be tested was prepared, and a portion of the feedstock stream was led out from the main pipeline; at different residual pressure values of the acetylene cylinder, the GC-FID was used to detect solvent concentration values at corresponding residual pressure values, the results being shown in FIG. 3. As the feedstock stream in the acetylene cylinder was released, the remaining pressure decreased, and the solvent concentration was essentially rising linearly. Similarly, another portion of the feedstock stream was led out from the main pipeline and entered a PID, the results being shown in FIG. 4. As the feedstock stream in the acetylene cylinder was outputted, the remaining pressure decreased, and the voltage value displayed by the PID gradually increased, exhibiting the same trend as FIG. 3.

Figure 3:
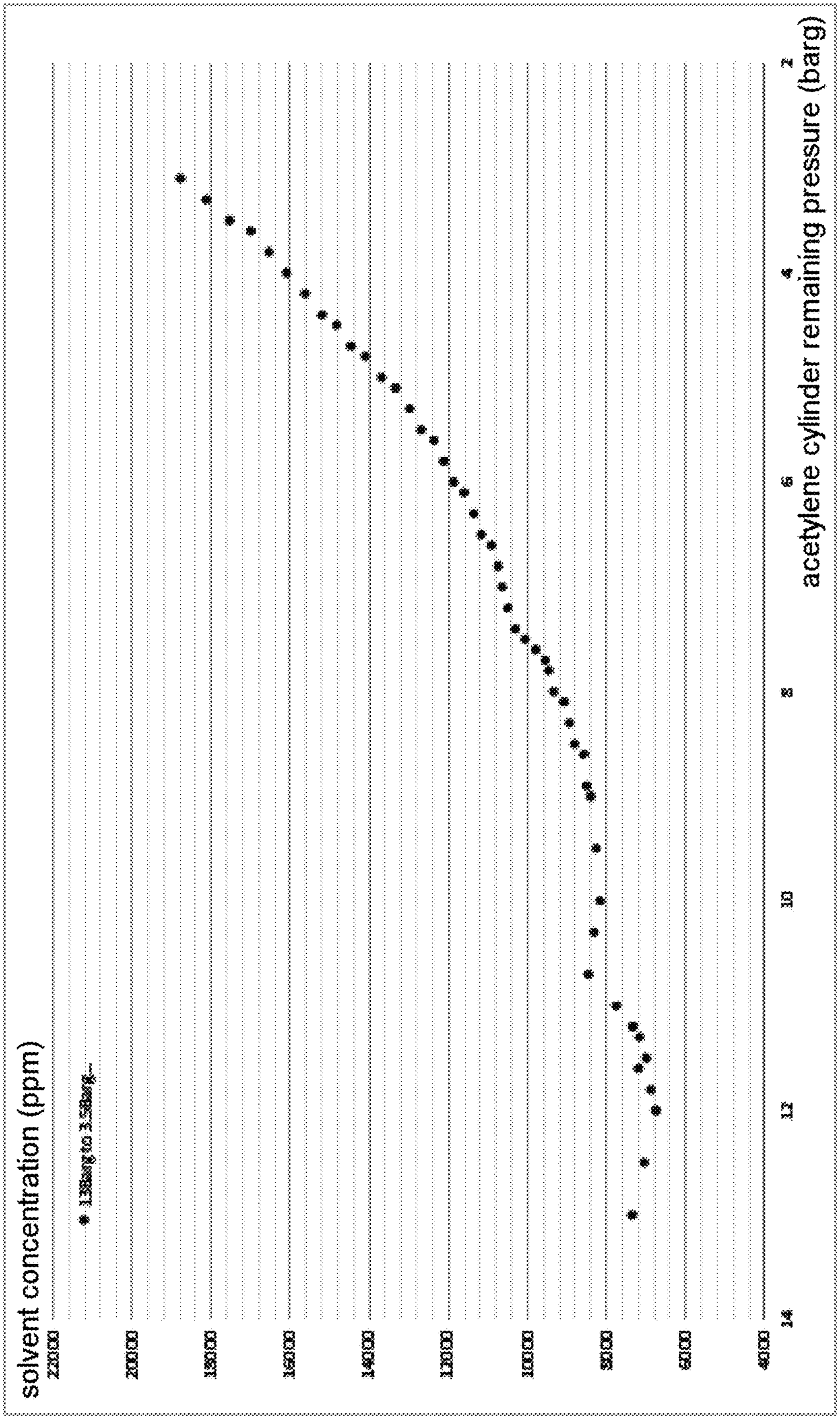
FIG. 3 shows solvent concentrations (ppm) corresponding to remaining pressures of an acetylene cylinder, as measured by a gas chromatography flame ionization detector (GC-FID).
Figure 4:
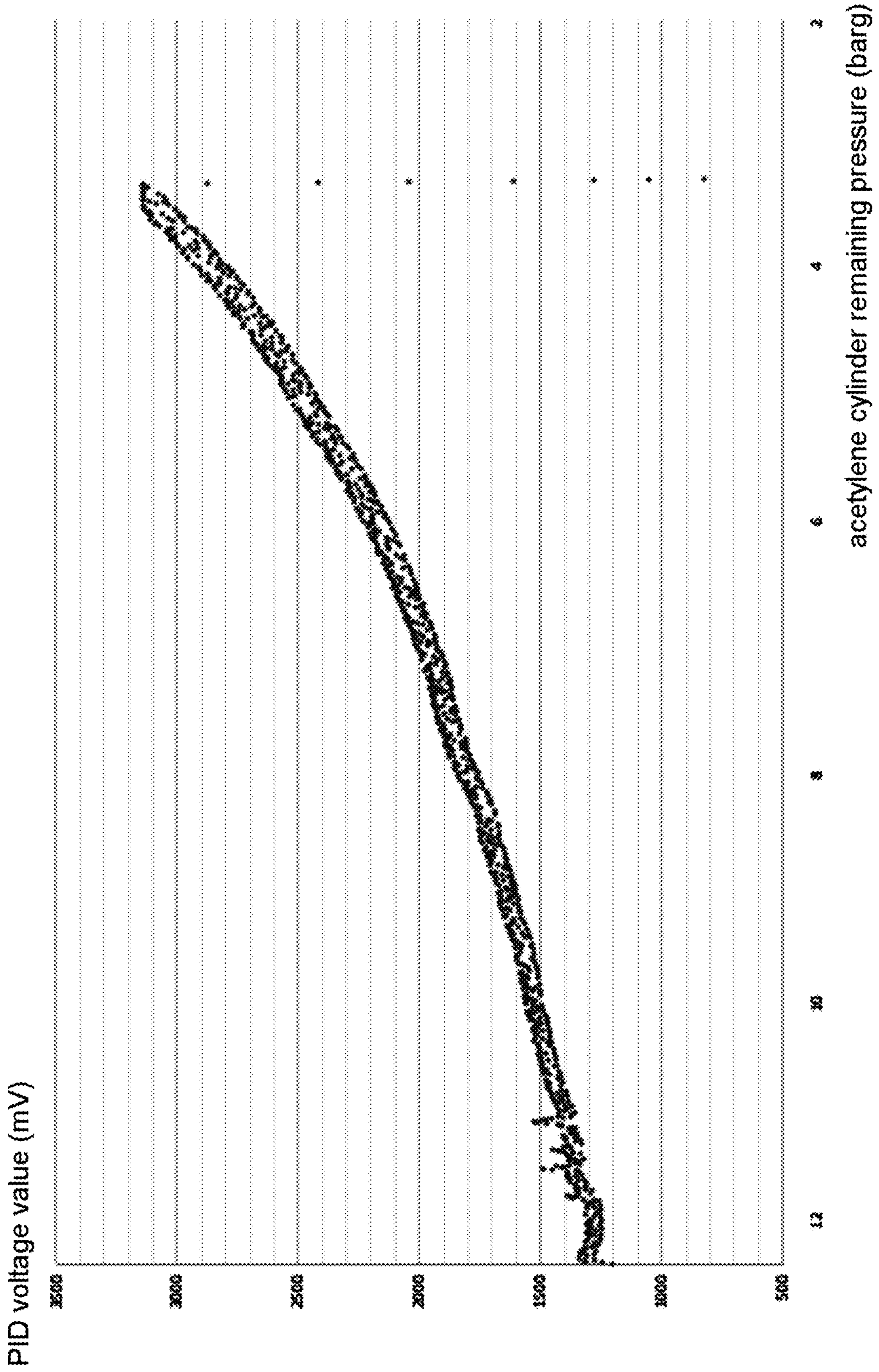
FIG. 4 shows voltage values (mV) corresponding to remaining pressures of an acetylene cylinder, as outputted by a PID.
Figure 5:
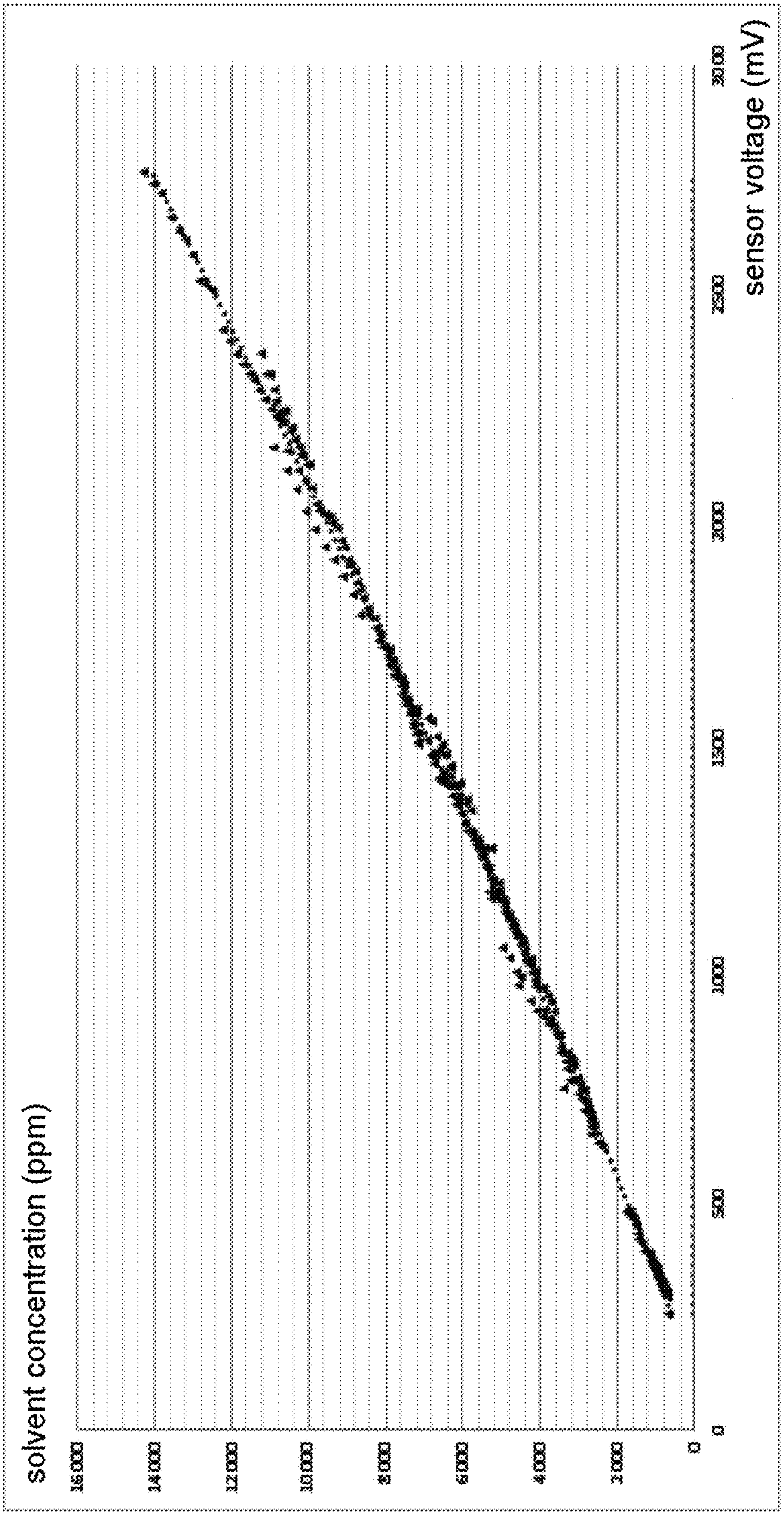
FIG. 5 shows a fitted curve of the voltage values outputted by the PID and solvent concentration values measured by the GC-FID.

The data in FIGS. 3 and 4 is fitted, as shown in FIG. 5. The response voltage value of the PID and the solvent concentration value of the GC-FID indicated a relatively obvious positive correlation.

It can be seen that the voltage value outputted by the photoionization sensor and the acetone concentration value have a very good linear response relationship. This linear response relationship is written into the control unit, and a linear characteristic equation for the acetylene cylinder is established.

Thus, during delivery of the feedstock stream, the control unit can obtain the solvent concentration value of interest by receiving the measurement signal issued by the PID and substituting it into the linear characteristic equation for computation.

For example, when acetylene cylinder 1 is selected for operation, when a preset value is exceeded by the solvent concentration computed via the control unit as time passes, the solenoid valve SW is switched to change to acetylene cylinder 2 to supply the feedstock stream.

An ultraviolet light source in the PID provides ultraviolet light of a specific energy level, and when the mixture of acetylene and solvent enters a measurement gas chamber through a porous membrane of the PID, the solvent is ionized after absorbing the energy of the ultraviolet light, thus producing an electrical signal between electrodes of the PID. FT represents a flow sensor, which is electrically connected to the control unit. The total amount of solvent delivered downstream can be obtained by integrating the computed solvent concentration and the flow sensor's flow rate value in the control unit. When the value exceeds a preset threshold for the total amount of solvent, an alarm is triggered.

Described above in this description are merely preferred specific embodiments of the present application, and the foregoing embodiments are merely used to explain the technical solution of the present application without limiting the present application. All technical solutions obtainable by those skilled in the art by logical analysis, reasoning or limited experiment based on the concept of the present application should fall within the scope of the present application.

What is claimed is:

1. A system for supplying acetylene comprising:

at least one acetylene storage apparatus, for supplying a feedstock stream comprising acetylene and a solvent;

a gas dilution apparatus, for uniformly mixing a portion of the feedstock stream with a diluting gas according to a ratio to obtain mixed gases to be measured, the gas dilution apparatus comprising a pressure equalization apparatus, a filtration apparatus, a flow regulating apparatus and a pre-mixing apparatus;

a detection apparatus, comprising a photoionization detector and a control unit, wherein the mixed gases to be measured enter the photoionization detector and are ionized by excitation, generating a measurement signal, and the control unit is configured to compute a solvent concentration on the basis of the measurement signal from the photoionization detector, make a comparison with a solvent concentration preset value, and output a control signal;

a gas supply regulating apparatus, comprising a solenoid valve, a pressure transmitter and a flow sensor, all of which are electrically connected to the control unit, the solenoid valve being used to switch the at least one acetylene storage apparatus, the pressure transmitter being used to detect a pressure of the feedstock stream outputted by each acetylene storage apparatus, and the flow sensor being used to detect a flow rate of a feedstock stream supplied to an acetylene-using apparatus.

2. The system according to claim 1, wherein in the gas dilution apparatus, the volume ratio of the diluting gas to the portion of the feedstock stream is greater than or equal to 50.

3. The system according to claim 1, wherein the at least one acetylene storage apparatus is an acetylene cylinder.

4. The system according to claim 1, wherein the pressure equalization apparatus in the gas dilution apparatus comprises a first pressure regulator for regulating the pressure of the portion of the feedstock stream, and a second pressure regulator for regulating the pressure of the diluting gas.

5. The system according to claim 4, wherein the first pressure regulator reduces the pressure of the portion of the feedstock stream entering a mixing volume of the dilution apparatus to below 0.5 barg.

6. The system according to claim 4, wherein the second pressure regulator reduces the pressure of the diluting gas entering a mixing volume of the dilution apparatus to below 0.5 barg.

7. The system according to claim 1, wherein a linear characteristic equation for acetone concentration-response voltage is contained in the control unit.

8. The system according to claim 1, wherein the flow regulating apparatus in the gas dilution apparatus comprises a first flow regulating apparatus for regulating a flow rate of the portion of the feedstock stream, and a second flow regulating apparatus for regulating a flow rate of the diluting gas.

* * * * *